US008662998B2

(12) United States Patent
Schueller

(10) Patent No.: US 8,662,998 B2
(45) Date of Patent: Mar. 4, 2014

(54) SYSTEMS AND METHODS FOR DYNAMICALLY ALTERING WAGERING GAME ASSETS

(75) Inventor: Darren Michael Schueller, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 59 days.

(21) Appl. No.: 13/221,598

(22) Filed: Aug. 30, 2011

(65) Prior Publication Data

US 2013/0053132 A1 Feb. 28, 2013

(51) Int. Cl.
*A63F 13/00* (2006.01)

(52) U.S. Cl.
USPC .............................................. 463/25; 463/29

(58) Field of Classification Search
USPC ......................................... 463/25, 30, 29, 31
See application file for complete search history.

(56) References Cited

U.S. PATENT DOCUMENTS 4,198,052 A 4/1980 Gauselmann
4,335,809 A 6/1982 Wain
4,516,777 A 5/1985 Nikora
4,593,376 A 6/1986 Volk
4,596,390 A 6/1986 Studley
4,611,808 A 9/1986 Palmer
4,636,951 A 1/1987 Harlick
4,722,527 A 2/1988 Gauselmann
4,775,937 A 10/1988 Bell
4,856,787 A 8/1989 Itkis
4,922,420 A 5/1990 Nakagawa et al.
4,964,638 A 10/1990 Ishida
5,042,809 A 8/1991 Richardson
5,083,271 A 1/1992 Thacher et al.
5,114,157 A 5/1992 Kita
5,242,163 A 9/1993 Fulton
5,249,800 A 10/1993 Hilgendorf et al.
5,259,613 A 11/1993 Marnell, II
5,342,047 A 8/1994 Heidel et al.
5,342,049 A 8/1994 Wichinsky et al.
5,413,357 A 5/1995 Schulze et al.
5,468,001 A 11/1995 Hermo
5,489,103 A 2/1996 Okamoto
5,643,086 A 7/1997 Alcorn et al.

(Continued)

FOREIGN PATENT DOCUMENTS

GB 1 542 284 3/1979
GB 1 545 301 5/1979

*Primary Examiner* — Arthur O. Hall
*Assistant Examiner* — Allen Chan
(74) *Attorney, Agent, or Firm* — Russell D. Culbertson, Esq.; Brian W. Oaks, Esq.; JP Cody, Esq.

(57) ABSTRACT

In accordance with embodiments of the present disclosure, a method may include presenting a wagering game at an electronic gaming machine in accordance with a gaming application stored on a local memory of the electronic gaming machine. The method may further include determining whether the electronic gaming machine is scheduled to present one or more replacement game assets in connection with the wagering game in lieu of one or more local game assets stored on the local memory. The method may also include, in response to determining that the electronic gaming machine is scheduled to present one or more replacement game assets: (i) downloading the one or more replacement game assets stored remotely from the wagering game to the local memory; and (ii) presenting the one or more replacement game assets in lieu of one or more local game assets during presentation of the wagering game.

18 Claims, 3 Drawing Sheets

(56) References Cited

U.S. PATENT DOCUMENTS

| | | | |
|---|---|---|---|
| 5,702,302 | A | 12/1997 | Gauselmann |
| 5,704,835 | A | 1/1998 | Dietz, II |
| 5,725,428 | A | 3/1998 | Achmuller |
| 5,740,897 | A | 4/1998 | Gauselmann |
| 5,755,621 | A | 5/1998 | Marks et al. |
| 5,759,102 | A | 6/1998 | Pease et al. |
| 5,766,076 | A | 6/1998 | Pease et al. |
| 5,770,533 | A | 6/1998 | Franchi |
| 5,779,545 | A | 7/1998 | Berg et al. |
| 5,785,595 | A | 7/1998 | Gauselmann |
| 5,802,544 | A | 9/1998 | Combs et al. |
| 5,833,538 | A | 11/1998 | Weiss |
| 5,851,149 | A | 12/1998 | Xidos et al. |
| 5,882,262 | A | 3/1999 | Ballhorn |
| 5,917,725 | A | 6/1999 | Thacher et al. |
| 5,923,252 | A | 7/1999 | Sizer et al. |
| 5,951,397 | A | 9/1999 | Dickinson |
| 5,997,400 | A | 12/1999 | Seelig et al. |
| 6,001,016 | A | 12/1999 | Walker et al. |
| 6,039,648 | A | 3/2000 | Guinn et al. |
| 6,047,127 | A | 4/2000 | McCarten et al. |
| 6,071,190 | A | 6/2000 | Weiss et al. |
| 6,082,887 | A | 7/2000 | Feuer et al. |
| 6,089,980 | A | 7/2000 | Gauselmann |
| 6,106,396 | A | 8/2000 | Alcorn et al. |
| 6,126,541 | A | 10/2000 | Fuchs |
| 6,126,542 | A | 10/2000 | Fier |
| 6,135,884 | A | 10/2000 | Hedrick et al. |
| 6,135,887 | A | 10/2000 | Pease et al. |
| 6,142,873 | A | 11/2000 | Weiss et al. |
| 6,149,522 | A | 11/2000 | Alcorn et al. |
| 6,219,836 | B1 | 4/2001 | Wells et al. |
| 6,254,481 | B1 | 7/2001 | Jaffe |
| 6,264,560 | B1 | 7/2001 | Goldberg et al. |
| 6,287,202 | B1 | 9/2001 | Pascal et al. |
| 6,293,866 | B1 | 9/2001 | Walker et al. |
| 6,309,299 | B1 | 10/2001 | Weiss |
| 6,312,334 | B1 | 11/2001 | Yoseloff |
| 6,315,664 | B1 | 11/2001 | Baerlocher et al. |
| 6,350,199 | B1 | 2/2002 | Williams et al. |
| 6,354,943 | B1 | 3/2002 | Miura |
| 6,361,437 | B1 | 3/2002 | Walker et al. |
| 6,361,440 | B1 | 3/2002 | Ogawa et al. |
| 6,364,769 | B1 | 4/2002 | Weiss et al. |
| 6,368,216 | B1 | 4/2002 | Hedrick et al. |
| 6,409,602 | B1 | 6/2002 | Wiltshire et al. |
| RE37,885 | E | 10/2002 | Acres et al. |
| 6,488,585 | B1 | 12/2002 | Wells et al. |
| 6,491,583 | B1 | 12/2002 | Gauselmann |
| 6,503,145 | B1 | 1/2003 | Webb |
| 6,508,709 | B1 | 1/2003 | Karmarkar |
| 6,517,437 | B1 | 2/2003 | Wells et al. |
| 6,524,184 | B1 | 2/2003 | Lind et al. |
| 6,589,119 | B1 | 7/2003 | Orus et al. |
| 6,605,003 | B2 | 8/2003 | Suchocki et al. |
| 6,609,978 | B1 | 8/2003 | Paulsen |
| 6,620,047 | B1 | 9/2003 | Alcorn et al. |
| 6,634,942 | B2 | 10/2003 | Walker et al. |
| 6,638,170 | B1 | 10/2003 | Crumby |
| 6,641,484 | B2 | 11/2003 | Oles et al. |
| 6,645,068 | B1 | 11/2003 | Kelly et al. |
| 6,645,077 | B2 | 11/2003 | Rowe |
| 6,645,078 | B1 | 11/2003 | Mattice |
| 6,646,695 | B1 | 11/2003 | Gauselmann |
| 6,656,047 | B1 | 12/2003 | Tarantino et al. |
| 6,656,048 | B2 | 12/2003 | Olsen |
| 6,659,866 | B2 | 12/2003 | Frost et al. |
| 6,669,566 | B2 | 12/2003 | Iijima et al. |
| 6,676,513 | B2 | 1/2004 | Gauselmann |
| 6,682,421 | B1 | 1/2004 | Rowe et al. |
| 6,682,423 | B2 | 1/2004 | Brosnan et al. |
| 6,712,698 | B2 | 3/2004 | Paulsen et al. |
| 6,743,102 | B1 | 6/2004 | Fiechter et al. |
| 6,749,510 | B2 | 6/2004 | Giobbi |
| 6,786,824 | B2 | 9/2004 | Cannon |
| 6,790,141 | B2 | 9/2004 | Muir |
| 6,800,030 | B2 | 10/2004 | Acres |
| 6,805,634 | B1 | 10/2004 | Wells et al. |
| 6,817,948 | B2 | 11/2004 | Pascal et al. |
| 6,830,515 | B2 | 12/2004 | Rowe |
| 6,832,958 | B2 | 12/2004 | Acres et al. |
| 6,843,723 | B2 | 1/2005 | Joshi |
| 6,843,725 | B2 | 1/2005 | Nelson |
| 6,846,238 | B2 | 1/2005 | Wells |
| 6,860,810 | B2 | 3/2005 | Cannon et al. |
| 6,884,167 | B2 | 4/2005 | Walker et al. |
| 6,884,170 | B2 | 4/2005 | Rowe |
| 6,884,171 | B2 | 4/2005 | Eck et al. |
| 6,884,173 | B2 | 4/2005 | Gauselmann |
| 6,884,174 | B2 | 4/2005 | Lundy et al. |
| 6,896,616 | B2 | 5/2005 | Weiss |
| 6,902,484 | B2 | 6/2005 | Idaka |
| 6,908,390 | B2 | 6/2005 | Nguyen et al. |
| 6,935,958 | B2 | 8/2005 | Nelson |
| 6,939,234 | B2 | 9/2005 | Beatty |
| 6,960,136 | B2 | 11/2005 | Joshi et al. |
| 6,971,956 | B2 | 12/2005 | Rowe et al. |
| 6,988,267 | B2 | 1/2006 | Harris et al. |
| 6,993,758 | B1 | 1/2006 | Fujita et al. |
| 7,040,987 | B2 | 5/2006 | Walker et al. |
| 7,070,506 | B1 | 7/2006 | Ropp et al. |
| 2001/0044337 | A1 | 11/2001 | Rowe et al. |
| 2002/0002078 | A1 | 1/2002 | Jaffe |
| 2002/0039923 | A1 | 4/2002 | Cannon et al. |
| 2002/0065132 | A1 | 5/2002 | Stephan |
| 2002/0107075 | A1 | 8/2002 | Stephan |
| 2002/0119824 | A1 | 8/2002 | Allen |
| 2002/0137217 | A1 | 9/2002 | Rowe |
| 2002/0138594 | A1 | 9/2002 | Rowe |
| 2002/0187828 | A1 | 12/2002 | Benbrahim |
| 2002/0188940 | A1 | 12/2002 | Breckner et al. |
| 2003/0001338 | A1 | 1/2003 | Bennett et al. |
| 2003/0008708 | A1 | 1/2003 | Suchocki et al. |
| 2003/0013511 | A1 | 1/2003 | Suzuki |
| 2003/0017865 | A1 | 1/2003 | Beaulieu et al. |
| 2003/0027625 | A1 | 2/2003 | Rowe |
| 2003/0036429 | A1 | 2/2003 | Witty et al. |
| 2003/0054886 | A1 | 3/2003 | Lion et al. |
| 2003/0060264 | A1 | 3/2003 | Chilton et al. |
| 2003/0060285 | A1 | 3/2003 | Itakura |
| 2003/0064771 | A1 | 4/2003 | Morrow et al. |
| 2003/0144965 | A1 | 7/2003 | Prasad et al. |
| 2003/0166417 | A1 | 9/2003 | Moriyama et al. |
| 2003/0216167 | A1 | 11/2003 | Gauselmann |
| 2003/0216182 | A1 | 11/2003 | Gauselmann |
| 2003/0228912 | A1 | 12/2003 | Wells et al. |
| 2004/0002379 | A1 | 1/2004 | Parrott et al. |
| 2004/0002385 | A1 | 1/2004 | Nguyen |
| 2004/0048657 | A1 | 3/2004 | Gauselmann |
| 2004/0048667 | A1 | 3/2004 | Rowe |
| 2004/0048671 | A1 | 3/2004 | Rowe |
| 2004/0053694 | A1 | 3/2004 | Rowe |
| 2004/0063500 | A1 | 4/2004 | Wells |
| 2004/0072617 | A1 | 4/2004 | Takahashi et al. |
| 2004/0097288 | A1 | 5/2004 | Sloate et al. |
| 2004/0106452 | A1 | 6/2004 | Nguyen et al. |
| 2004/0110566 | A1 | 6/2004 | Schneider |
| 2004/0132530 | A1 | 7/2004 | Rutanen et al. |
| 2004/0142737 | A1 | 7/2004 | Gauselmann |
| 2004/0147325 | A1 | 7/2004 | Kuwana |
| 2004/0152516 | A1 | 8/2004 | Blatter et al. |
| 2004/0166931 | A1 | 8/2004 | Criss-Puszkiewicz et al. |
| 2004/0176167 | A1 | 9/2004 | Michaelson et al. |
| 2004/0180721 | A1 | 9/2004 | Rowe |
| 2004/0198496 | A1 | 10/2004 | Gatto et al. |
| 2004/0204244 | A1 | 10/2004 | Rathsack et al. |
| 2004/0209692 | A1 | 10/2004 | Schober et al. |
| 2004/0224753 | A1 | 11/2004 | O'Donovan et al. |
| 2004/0229700 | A1 | 11/2004 | Cannon et al. |
| 2004/0242324 | A9 | 12/2004 | Walker et al. |
| 2004/0248642 | A1 | 12/2004 | Rothschild |
| 2004/0254013 | A1 | 12/2004 | Quraishi et al. |
| 2004/0266533 | A1 | 12/2004 | Gentles et al. |
| 2005/0020352 | A1 | 1/2005 | Chilton et al. |

(56) References Cited

U.S. PATENT DOCUMENTS

| | | | | |
|---|---|---|---|---|
| 2005/0043089 | A1 | 2/2005 | Nguyen et al. | |
| 2005/0043094 | A1 | 2/2005 | Nguyen et al. | |
| 2005/0049048 | A1 | 3/2005 | Wilder et al. | |
| 2005/0054431 | A1 | 3/2005 | Walker et al. | |
| 2005/0096121 | A1 | 5/2005 | Gilliland et al. | |
| 2005/0148380 | A1 | 7/2005 | Cannon et al. | |
| 2005/0171808 | A1 | 8/2005 | Saenz et al. | |
| 2005/0181856 | A1 | 8/2005 | Cannon et al. | |
| 2005/0192089 | A1 | 9/2005 | Blatter et al. | |
| 2005/0221882 | A1 | 10/2005 | Nguyen et al. | |
| 2005/0227769 | A1 * | 10/2005 | Morrow et al. | 463/42 |
| 2005/0227771 | A1 | 10/2005 | Nelson et al. | |
| 2005/0239545 | A1 | 10/2005 | Rowe | |
| 2006/0019744 | A1 | 1/2006 | Roemer | |
| 2006/0030959 | A1 | 2/2006 | Duhamel | |
| 2006/0030960 | A1 | 2/2006 | Duhamel et al. | |
| 2006/0063575 | A1 | 3/2006 | Gatto et al. | |
| 2006/0148565 | A1 | 7/2006 | Gauselmann et al. | |
| 2006/0252529 | A1 * | 11/2006 | Hedrick et al. | 463/29 |
| 2007/0060387 | A1 | 3/2007 | Enzminger et al. | |
| 2008/0214307 | A1 * | 9/2008 | Arbogast et al. | 463/42 |
| 2009/0124372 | A1 * | 5/2009 | Gagner et al. | 463/29 |
| 2009/0298575 | A1 * | 12/2009 | Hopkins et al. | 463/25 |

* cited by examiner

SYSTEMS AND METHODS FOR DYNAMICALLY ALTERING WAGERING GAME ASSETS

TECHNICAL FIELD OF THE DISCLOSURE

The present disclosure relates generally to gaming systems, machines, and methods used to provide wagering games, and, more particularly, to systems and methods for dynamically altering wagering game assets.

BACKGROUND

Gaming systems, machines, and methods used to provide wagering games may be electronically implemented by mechanisms akin to traditional slot machines. These may be referred to as "slot machines" because they commonly show the result of a wager by displaying reels of symbols or empty spaces, and indicating a payout based on particular alignments or combinations of the symbols or empty spaces. In an electronic slot machine, the results may be determined by generating a random number to select a payout from a set or range of possible payouts.

Gaming systems, machines, and methods used to provide wagering games may be electronically implemented by instant lottery systems. These may be referred to as "video lottery" systems because they commonly show the result of a play in the lottery game on a video display device at the player terminal. In an electronic lottery gaming system, the results may be identified by a set of electronic lottery records. The set of electronic lottery records may be analogous to a set of printed paper lottery game tickets. Individual lottery game play records may be assigned from the set of electronic lottery game play records in some random order in response to requests for plays in the lottery game. The result defined by an assigned electronic lottery game play record may be displayed at an electronic lottery player station rather than on a printed lottery ticket. As in traditional paper lotteries, the rules by which the set of lottery records is created for an electronic lottery game determines the overall prize distribution for the game. For example, an electronic lottery game set may include one million records, with one record associated with the top prize, ten records associated with a next highest prize, and so forth throughout all of the potential results available in the lottery game set.

Gaming systems, machines, and methods used to provide wagering games may be electronically implemented by predetermined cards or displays and include a number of designations randomly arranged in a grid, matrix, or other layout of locations. The may be referred to as "bingo" systems. The game board or display may be represented by a data structure which defines a representation having various card or display locations and designations associated with the locations. For example, in a traditional bingo game sequence, a number of the predetermined bingo cards are first sold for a particular bingo game. After the sale of bingo cards is closed for a given game, designations are randomly selected from a pool of available designations and matched to the designations on each bingo card that is in play in the bingo game. This matching of bingo designations randomly selected for a game and bingo designations associated with a bingo card in play in the game may be referred to as daubing the card.

Often, an electronic gaming machine may include assets including graphical assets, audio assets, and/or other assets displayed to a display of the electronic gaming machine, audibly played via a speaker of the electronic gaming device, or otherwise communicated to a user in connection with game play. For example, graphical assets may include symbols appearing on "virtual" slot machine reels, logos, and/or other game display graphics. As another example, audio assets may include sounds played in connection with some aspect of game play (e.g., chimes or bells if a player wins, a buzzer if a player loses, sounds simulating spins of slot reels, etc.). Traditionally, such assets are typically stored as part of a gaming application program stored on read-only storage media of the electronic gaming machine. Such gaming applications must often be approved or certified by national, state, provincial, regional, local, or tribal regulatory authorities, and any modifications to such applications typically require re-certification. Thus, using traditional approaches, graphical assets, audio assets, and other assets of en electronic are typically static in nature. In addition, modification of an electronic gaming machine to include new assets typically requires replacement of a gaming application with a new gaming application including the new assets, which may lead to game downtime, and thus, decreased revenue for a game operator.

SUMMARY

In accordance with embodiments of the present disclosure, a system may include an asset server and an electronic gaming machine remotely communicatively coupled to the asset server, the electronic gaming machine comprising a local memory. The electronic gaming machine may be configured to present a wagering game in accordance with a gaming application stored on the local memory. The electronic gaming machine may further be configured to, in response to a message received from the asset server indicating that the electronic gaming machine is scheduled to present one or more replacement game assets: (i) download the one or more replacement game assets to the local memory; and (ii) present the one or more replacement game assets in lieu of one or more local game assets during presentation of the wagering game.

In accordance with additional embodiments of the present disclosure, a method may include presenting a wagering game at an electronic gaming machine in accordance with a gaming application stored on a local memory of the electronic gaming machine. The method may further include determining whether the electronic gaming machine is scheduled to present one or more replacement game assets in connection with the wagering game in lieu of one or more local game assets stored on the local memory. The method may also include, in response to determining that the electronic gaming machine is scheduled to present one or more replacement game assets: (i) downloading the one or more replacement game assets stored remotely from the wagering game to the local memory; and (ii) presenting the one or more replacement game assets in lieu of one or more local game assets during presentation of the wagering game.

In accordance with further embodiments of the present disclosure, an article of manufacture may include a computer readable medium and computer-executable instructions carried on the computer readable medium, the instructions readable by a processor. The instructions, when read and executed, may cause the processor to: (i) present a wagering game at an electronic gaming machine in accordance with a gaming application stored on a local memory of the electronic gaming machine; (ii) determine whether the electronic gaming machine is scheduled to present one or more replacement game assets in connection with the wagering game in lieu of one or more local game assets stored on the local memory; and (iii) in response to determining that the electronic gaming machine is scheduled to present one or more replacement game assets: (a) download the one or more replacement game assets stored remotely from the wagering game to the local memory; and (b) present the one or more replacement game assets in lieu of one or more local game assets during presentation of the wagering game.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
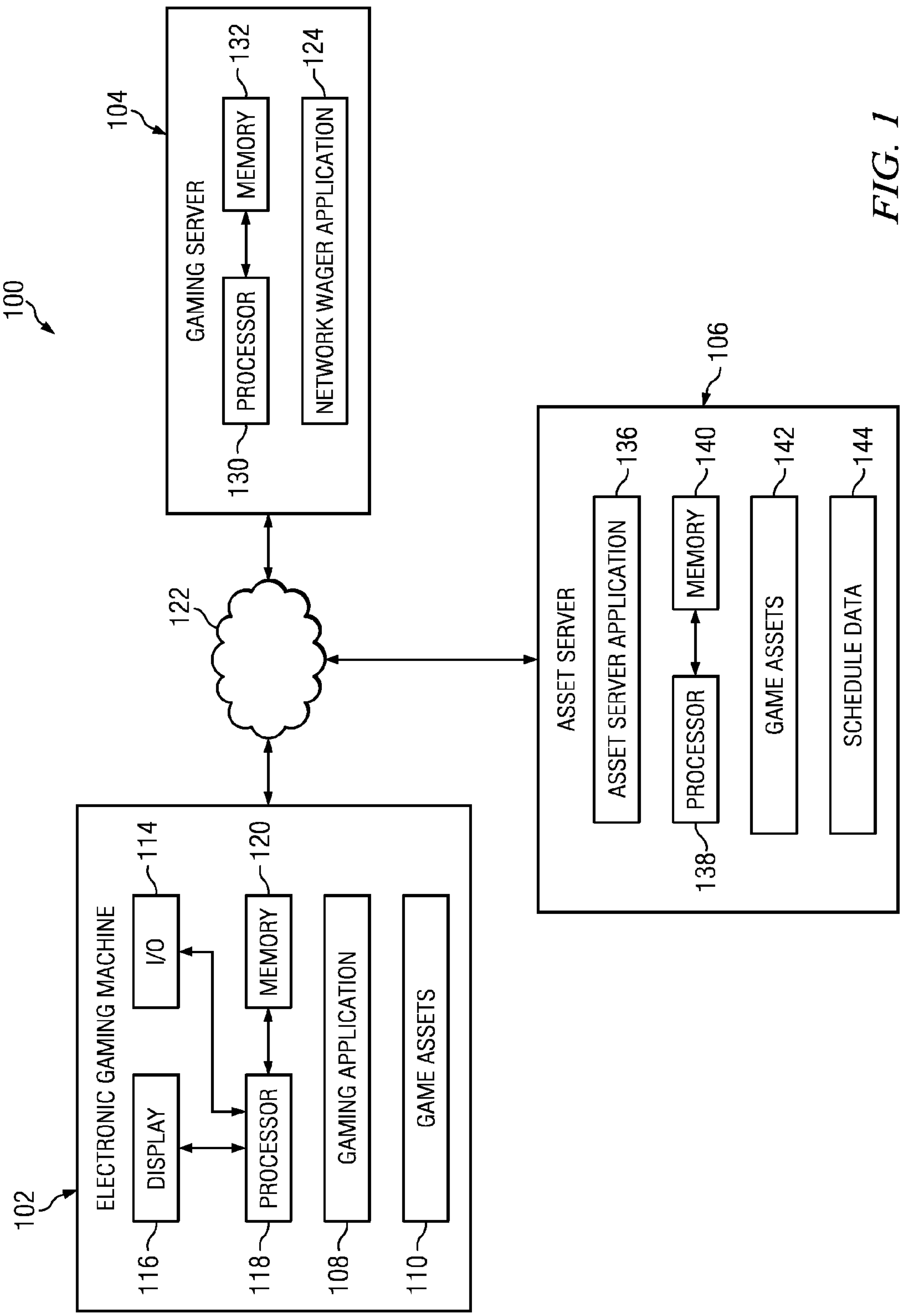
FIG. 1 illustrates a block diagram of an example embodiment of a system for dynamically altering game assets of an electronic gaming machine, in accordance with embodiments of the present disclosure.

FIG. 1 illustrates a block diagram of an example embodiment of a system 100 for dynamically altering game assets of an electronic gaming machine, in accordance with embodiments of the present disclosure. System 100 may include an electronic gaming machine ("EGM") 102 communicatively coupled to a gaming server 104 and/or an asset server 106. EGM 102 may be configured for providing a wagering game to a user, who may play the wagering game in combination with placing a wager through a gaming application 108. System 100 may be configured to provide a randomized prize associated with the wager.

EGM 102 may be implemented in any suitable manner according to the teachings of this disclosure. EGM 102 may be implemented, for example, in an electronic device such as a portable device, tablet device, mobile device, traditional wagering game cabinet, or arcade gaming cabinet. EGM 102 may include a processor 118 coupled to a memory 120. Processor 118 may be configured to execute different logic or instructions stored in memory 120. Processor 118 may be coupled to one or more displays 116 and input/output ("I/O") 114. EGM 102 may include any suitable display 116 and I/O 114. For example, display 116 may include a display of a portable device, tablet device, mobile device, or game cabinet. I/O 114 may include one or more buttons, switches, a touch screen panel, joysticks, levers, trackballs, or any other suitable I/O mechanisms. Although system 100 is illustrated having a single EGM 102, system 100 may include more EGMs networked together through gaming server 104. Such EGMs may make up a bank of gaming devices in, for example, a casino or part of a casino. In one embodiment, one or more EGMs of system 100 may include portable or similar devices that may be checked out from a kiosk in a casino. In another embodiment, one or more EGMs of system 100 may include player-owned mobile devices which may install gaming applications and be usable within the premises of a casino. In yet another embodiment, gaming application 108 may be executed on a remote memory of a machine other than EGM 102, such as gaming server 104, and EGM 102 may be configured to act as a thin client for displaying gaming application 108 while offloading some or all of the processing required, for example, for gaming application 108.

Although system 100 is illustrated having an EGM 102 communicatively coupled to a gaming server 104, wherein the gaming server 104 contains several mechanisms for conducting game play such as network wager application 124, in various embodiments one or more of the components of gaming server 104 as described may be implemented by or on EGM 102. In one embodiment, all wagering computation, payouts, or determinations may be conducted on EGM 102. In such embodiments, EGM 102 may be configured to function as a stand-alone machine. In such embodiments, EGM 102 may be configured to connect to a server such as gaming server 104 for activities such as reporting, but not in order to conduct individual skill games and/or wagers.

Processors 118, 130, 138 may comprise, for example a microprocessor, microcontroller, digital signal processor (DSP), application specific integrated circuit (ASIC), or any other digital or analog circuitry configured to interpret and/or execute program instructions and/or process data. In some embodiments, processors 118, 130, 138 may interpret and/or execute program instructions and/or process data stored in memories 120, 132, 140. Memories 120, 132, 140 may be configured in part or whole as application memory, system memory, or both. Memories 120, 132, 140 may include any system, device, or apparatus configured to hold and/or house one or more memory modules. Each memory module may include any system, device or apparatus configured to retain program instructions and/or data for a period of time (e.g., computer-readable media). For example, a memory module may include random access memory (RAM), electrically erasable programmable read-only memory (EEPROM), a PCMCIA card, flash memory, magnetic storage, opto-magnetic storage, or any suitable selection and/or array of volatile or non-volatile memory.

EGM 102 may include a gaming application 108 including wagering components. Gaming application 108 may be implemented in any suitable mechanism, such as an application, script, module, shared library, function, or routine. Gaming application 108 may be configured to present one or more games of chance to a user of EGM 102. Successful play of gaming application may be primarily accorded to chance, such as in many traditional casino games such as bingo, slot machines, Blackjack, craps, roulette, etc. Such games may primarily depend on chance even when optimally played by a user.

To enhance user enjoyment of EGM 102, gaming application 108 may be configured to, during execution, read game assets 110 and process game assets 110 for visual, auditory, and/or other output to display 116 and/or I/O 114 in connection with game play. For example, game assets 110 may include graphical image files (e.g., JPEG, PNG, GIF, BMP, etc.) that may comprise digitally-encoded representations of symbols, logos, and/or other graphical elements that gaming application 108 may cause to be displayed to a user via display 116 in connection with wagering or game play. As another example, game assets 110 may include audio data files (e.g., WAV, MP3, etc.) that may comprise digitally-encoded representations of sounds, spoken words, and/or other auditory elements that gaming application 108 may cause to be played via I/O 114 (e.g., an audio speaker) in connection with wagering or game play.

EGM 102 may include features for gaming actions, such as adding money for wagering, picking a certain number of credits or money to wager, cashing out deposited credits or money, or calling an attendant. Gaming application 108 may be configured to enable a user of EGM 102 to place a wager.

Gaming application 108 may be configured to require a wager before gaming application 108 proceeds with game play. Gaming application 108 may be configured to determine a randomized prize for the wager by accessing gaming server 104. Such a randomized prize may be implemented by any suitable mechanism of casino wagering and randomized prizes, for example, those used in slot machines, bingo games, Class II or Class III devices. Gaming application 108, alone or in combination with other applications for evaluating wagers, may be configured to accept payment from a user, keep track of the available funds or credits with which to play, and provide indications to the user of prizes or payouts received as a result of wagering. Gaming application 108 may be configured to cash out a balance of a user's available funds. The funds used to wager may be represented in currency, credits, or any other suitable unit.

Gaming server 104 may be configured to communicate with gaming application 108 to facilitate game play. Gaming server 104 may include a processor 130 coupled to a memory 132. Processor 130 may be configured to execute logic for components of gaming server 104 such as network wager application 124.

Network wager application 124 may be communicatively coupled to various EGMs such as EGM 102, and configured to monitor wagering occurring at each such EGM 102. In one embodiment, network wager application 124 may be configured to conduct randomized prize determinations on behalf of gaming application 108. For example, network wager application 124 may be configured to conduct a bingo game to determine potential prizes to a given EGM 102. In another embodiment, such prize determinations may be made in gaming application 108 itself. Network wager application 124 may be configured to award prizes based on a randomized event, such as a bingo game or random number generator and payout table. In various embodiments, some portions or functionality of gaming server 104 may be implemented within an individual EGM 102, or vice-versa.

Asset server 106 may be communicatively coupled to gaming server 104 and/or EGM 102. Asset server 106 may include a processor 138 coupled to a memory 140. Processor 138 may be configured to execute logic for components of asset server 106 such as asset server application 136, for example. Although a single asset server 106 is shown, the functionality of asset server 106 may be implemented in or more servers maintained by various entities.

Asset server 106 may be configured to store additional game assets 142 for gaming application 108 such that, as described in greater detail below, gaming application 108 may, alone or in connection with asset server application 136, and in accordance with information set forth in schedule data 144, replace certain game assets 110 with game assets 142 or otherwise present certain game assets 142 in lieu of certain game assets 110 during game play. Asset server application 136 may be configured to communicate with gaming application 108 to facilitate such replacement by or use of game assets 142, as is also described in greater detail below.

Asset server 106, gaming server 104, and EGM 102 may be communicatively coupled by one or more networks such as network 122. Network 122 may include any suitable type or kind of networks for communicating among asset server 106, gaming server 104, and EGM 102, such as: the Internet, an intranet, wide-area-networks, local-area-networks, backhaul-networks, peer-to-peer-networks, or any combination thereof.

In operation of certain embodiments of system 100, asset server 106 may be locally or remotely configured (e.g., via network 122) by a casino operator or other individual (e.g., via interfacing with asset server application 136) to schedule presentation of certain game assets 142 at certain dates, days of the week, and/or times (e.g., in lieu of those game assets 110 stored on EGM 102). For example, a casino operator may configure a schedule such that during a particular day or certain time of day (e.g., 3:00 pm to 4:00 pm on Mondays, Wednesdays, and Fridays) certain graphical and/or auditory assets present in game assets 142 may be presented at EGM 102 in lieu of certain game assets 110 (e.g., "standard" virtual slot machine reel symbols such as cherries, bars, lucky 7's may be replaced by logos of advertisers who have paid for advertising on EGM 102 and/or standard sounds such as bells may be replaced by greetings or slogans). As another example, a casino operator may configure a schedule such that during a particular holiday season certain graphical and/or auditory assets present in game assets 142 may be presented at EGM 102 in lieu of certain game assets 110 (e.g., during the month of December, "standard" virtual slot machine reel symbols such as cherries, bars, lucky 7's may be replaced by symbols thematic of the winter season, such as snowmen, Christmas trees, candy canes, holly, etc., and/or sounds such as bells may be replaced by sleigh bells, "HO! HO! HO!," etc.). In addition or alternatively, a casino operator may configure asset server 106 such that schedules for presentation of game assets may be set on an EGM-by-EGM basis, on the basis of rows or banks of EGMs, a casino-by-casino basis, a regional basis, a national basis, a worldwide basis, or at any other level of granularity. Information regarding scheduling of game assets may be stored as part of schedule data 144.

Furthermore, in addition to scheduling replacement of game assets at a future time, a casino operator may immediately schedule replacement of game assets, such that game assets are immediately replaced upon a casino operator's command, and replacement game assets may be presented during a set period of time or indefinitely. Accordingly, as used herein, the terms "schedule," "scheduling," and grammatical variants thereof contemplate not only future scheduling of replacement game assets, but also such immediate scheduling of replacement game assets.

EGM 102 may be configured to present game assets to display 116 and/or I/O 114 based schedule data 144 configured at asset server 106. For example, in one embodiment, upon startup of EGM 102, gaming application 108 may execute and read game assets 110 stored on read-only media local to EGM 102. Such read-only media may be certified by a government authority. At regular intervals (e.g., hourly, daily, weekly, or at any other suitable interval), gaming application 108 may communicate to asset server application 136 to determine if EGM 102 is scheduled to replace one or more game assets 110 with one or more game assets 142 present at asset server 106. If asset server application 136, with reference to a schedule data 144, determines that EGM 102 is scheduled to replace one or more game assets 110 with one or more game assets 142 present at asset server 106, asset server application 136 may communicate a list of game assets to be replaced along with one or more network addresses (e.g., a HyperText Transport Protocol Uniform Resource Locators) from where gaming application 108 may download or reference replacement game assets. Gaming application 108 may then download the replacement game assets locally to a memory (e.g., memory 120) of EGM 102 and present such replacement game assets until the schedule for such replacement game assets expires. For example, gaming application 108 may include a variable for each given replaceable game asset 110 indicating whether, at the present moment, the given game asset 110 is to be replaced. Based on such variable, gaming application 108 may, for the given game asset 110, present the locally-stored game asset 110 or alternatively present a replacement game asset. As a specific example, a display routine for a particular graphical asset may be implemented as an "if, else" function or similar programming function (e.g., if replace=yes, display symbol_replace.jpg; else display symbol_local.jpg).

After the schedule for the replacement assets expires, gaming application 108 may revert to game assets 110 present on EGM 102.

While the foregoing contemplates replacement of game assets using a "pull" approach, in some embodiments, replacement of game assets may be performed using a "push" approach. In such a push approach, rather than asset server application 136 responding to messages received from EGM 102 at regular intervals, asset server application 136 may be configured to, based on schedule data 144 and without first receiving a message from EGM 102, communicate to EGM 102 that the EGM is scheduled to replace assets and/or communicate information regarding replacement assets (e.g., addresses of replacement assets) for download by EGM 102.

Figure 2A:
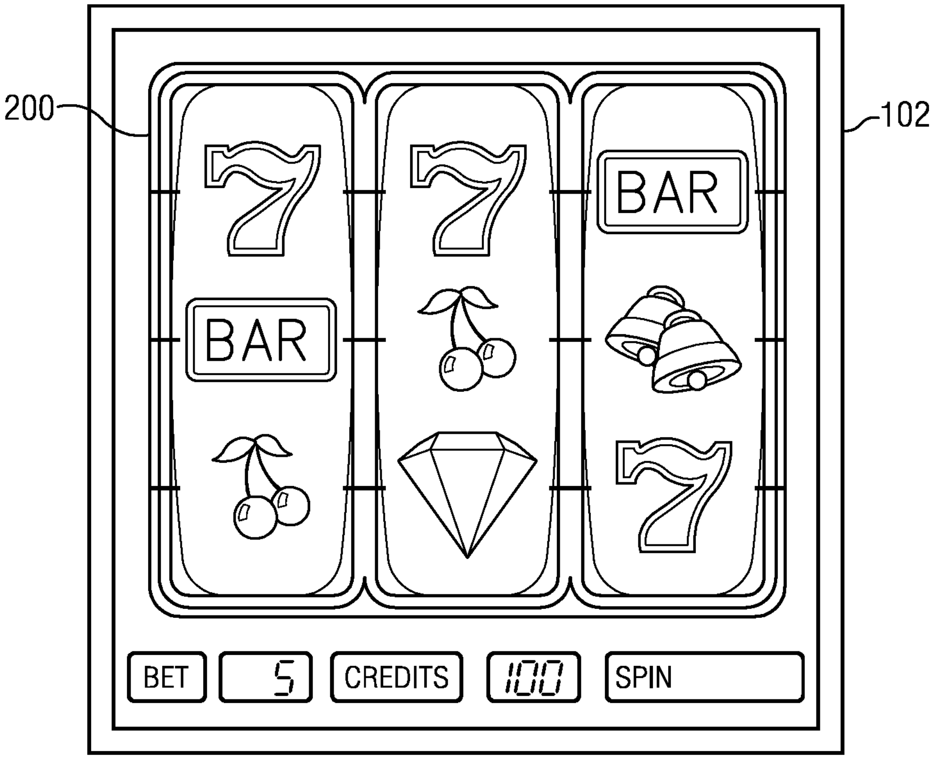
FIGS. 2A and 2B illustrate example screens of a display of an electronic gaming machine depicting replacement of game assets of the electronic gaming machine, in accordance with embodiments of the present disclosure.
Figure 2B:
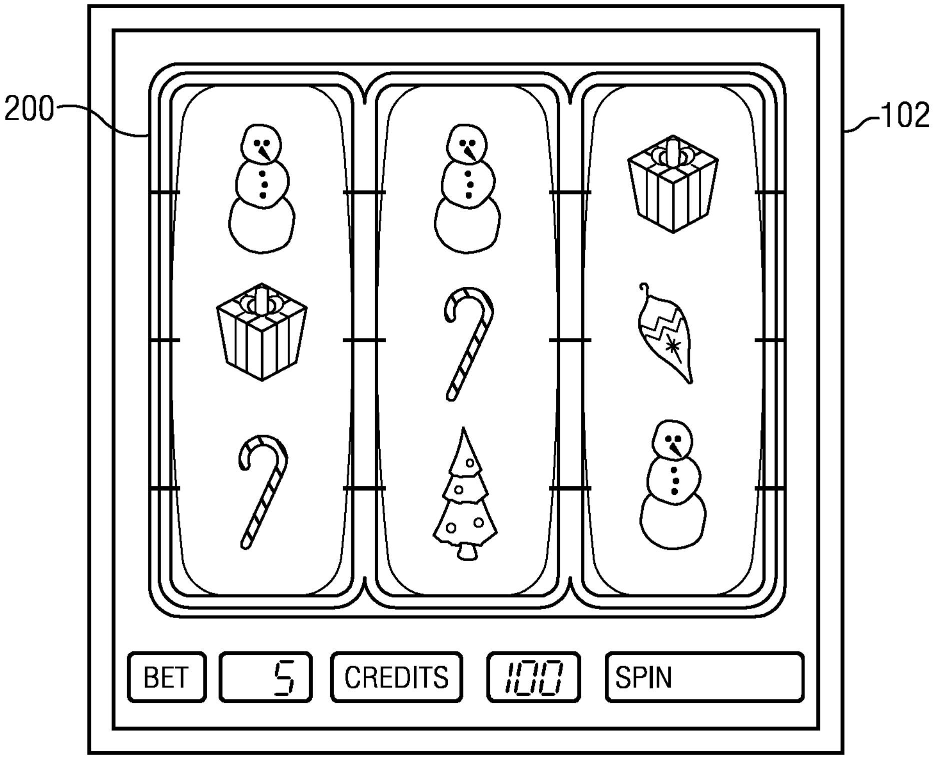

FIGS. 2A and 2B illustrate example screens 200 of a display of an EGM 102 depicting replacement of game assets of the electronic gaming machine, in accordance with embodiments of the present disclosure. FIG. 2A depicts an example screen 200 of an EGM 102 at times in which EGM 102 is scheduled to present game assets 110 stored locally to EGM 102. As discussed above, EGM 102 may from time to time be scheduled to present replacement game assets in accordance with schedule data 144 present at asset server 106. When scheduled to present replacement assets, EGM 102 in concert with asset server 106 may download replacement assets to memory 120 of EGM 102, and present such replacement assets, as shown in FIG. 2B. In FIG. 2B, slot reel symbols thematic of the winter holiday season are depicted replacing the traditional slot reel symbols of FIG. 2A, as may be scheduled by a casino operator to occur during the winter holiday season. For example, images of "lucky 7's" may be replaced with images of snowmen, images of cherries may be replaced with images of candy canes, images of bars may be replaced with gift-wrapped presents, etc. Thus, during operation of EGM 102, instead of a winning result being associated with a particular combinations of traditional reel symbols, a winning result may be associated with particular combinations of the respective replacement reel symbols. For example, rather than a row of cherries being associated with winning a jackpot, a row of candy canes may be associated with winning a jackpot.

Figure 3:
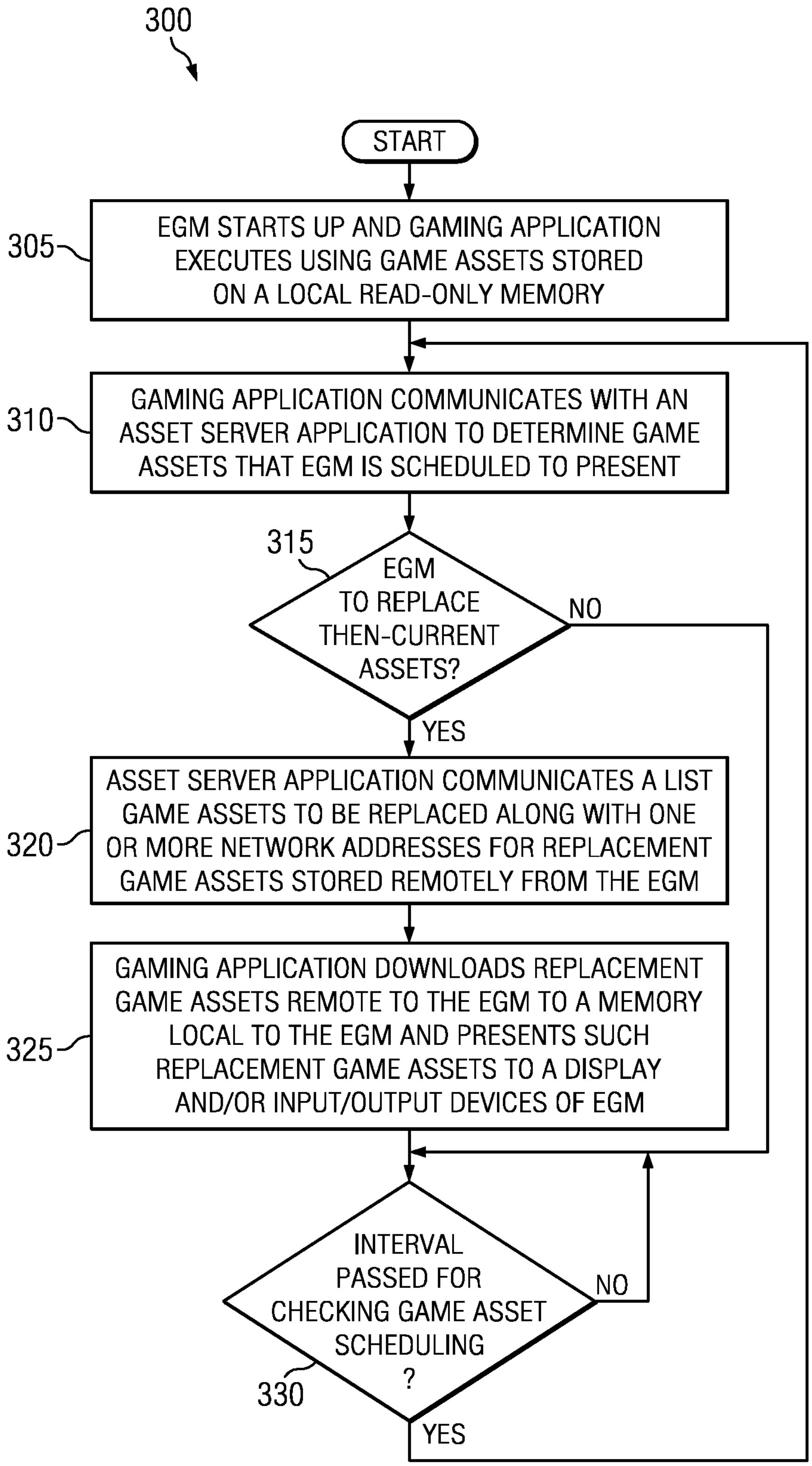
FIG. 3 illustrates a flow chart of an example method for dynamically altering game assets of an electronic gaming machine, in accordance with embodiments of the present disclosure.

FIG. 3 illustrates a flow chart of an example method 300 for dynamically altering game assets of an electronic gaming machine, in accordance with embodiments of the present disclosure. In step 305, an EGM may startup and a gaming application resident on read-only memory local to the EGM may execute using game assets stored on the read-only memory. In step 310, the gaming application may communicate with an asset server application of an asset server to determine game assets the EGM is scheduled to present.

In step 315, in response to the communication from gaming application, the asset server application may reference schedule data to determine if a schedule for the EGM indicates that the EGM is scheduled to replace one or more game assets that the EGM is then configured to present. Such schedule data may be set by a casino operator or other individual interacting with the asset server. If the EGM is scheduled to replace one or more then-current assets, method 300 may proceed to step 320. Otherwise, method 300 may proceed to step 330.

In step 320, in response to a determination that the EGM is scheduled to replace one or more then-current assets, the asset server application may, to the extent the replacement game assets are remote to the EGM (e.g., stored on the asset server), communicate a list of game assets to be replaced along with one or more network addresses (e.g., a HyperText Transport Protocol Uniform Resource Locators) from where the gaming application may download or reference replacement game assets. If the replacement game assets are local to the EGM (e.g., the EGM is scheduled to present assets stored to a memory local to the EGM after the scheduled expiration of a schedule to present game assets stored remotely to the EGM), the gaming application (alone or in concert with the asset server application), may configure itself to present such locally-stored assets. In step 325, the gaming application may download replacement game assets remote to the EGM to a memory local to the EGM and present such replacement game assets (and non-replaced game assets, if applicable) to a display and/or input/output devices of the EGM.

In step 330, the gaming application may determine if an interval has passed for checking game asset scheduling. Such interval may be in accordance with a timer or clock maintained by the gaming application. If the interval has passed (e.g., a timer has expired), method 300 may proceed again to step 310. Otherwise, step 330 may repeat until such interval has passed.

Method 300 may be implemented using the system of FIG. 1, or any other system operable to implement method 300. As such, the preferred initialization point for method 300 and the order of its steps may depend on the implementation chosen. In some embodiments, some steps may be optionally omitted, repeated, or combined. In some embodiments, some steps of method 300 may be executed in parallel with other steps of method 300. In certain embodiments, method 300 may be implemented partially or fully in software embodied in computer-readable media.

Although the foregoing discussion contemplates particular examples of replacement of game assets and/or presentation of alternative game assets of a wagering game, the systems and methods disclosed herein may be broadly applied to any game asset of a wagering game not affecting behavior of the underlying game of chance (e.g., bingo, lottery, random number generator, etc.) or result thereof. Behavioral aspects of a wagering game relating to wagering, result of game play, or other game behaviors may be subject to governmental regulation, approval, or certification. However, game assets that affect how such wagering, game play, game results, and other game behaviors are presented to an EGM user may be unregulated or subject to less regulatory scrutiny. Thus, replacement of or presentation of alternative graphics, auditory effects, and/or other non-behavioral elements as contemplated herein may allow a casino operator to obtain certification of a gaming application 108 and/or EGM 102 by a regulatory authority while permitting a casino operator to configure how such gaming application is presented at an EGM 102, without requiring the gaming application 108 to be modified, thus potentially: (i) reducing or eliminating the need for governmental authority re-certification, and (ii) reducing or eliminating EGM downtime associated with replacing code stored in a read-only memory of the EGM.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A system, comprising:

an asset server including asset server memory storing schedule data which specifies one or more replacement game assets and specifies a respective time for each of the one or more replacement game assets to be presented in the system; and an electronic gaming machine remotely communicatively coupled to the asset server, the electronic gaming machine comprising a local memory and configured to:

present a wagering game in accordance with a gaming application stored on the local memory;

communicate a query to the asset server to determine whether the schedule data specifies that the one or more replacement game assets are scheduled to be presented at the electronic gaming machine at a point in the future; and in response to a message received from the asset server indicating that the schedule data specifies that the one or more replacement game assets are scheduled to be presented at the electronic gaming machine in the future in connection with the wagering game in lieu of one or more local game assets stored on the local memory:

download the one or more replacement game assets to the local memory; and present the one or more replacement game assets in lieu of the one or more local game assets during presentation of the wagering game.

2. The system of claim 1, the asset server further configured to communicate to the electronic gaming machine one or more addresses for the one or more replacement game assets in response to determining that the schedule data specifies that the one or more replacement game assets are scheduled to be presented at the electronic gaming machine.

3. The system of claim 1, the electronic gaming machine configured to communicate the query at regular intervals.

4. The system of claim 1, the electronic gaming machine configured to present the one or more local game assets if the one or more replacement game assets are not scheduled to be presented at the electronic gaming machine.

5. The system of claim 1, wherein the one or more local game assets and the one or more replacement game assets comprise at least one of a graphic for presentment via a display device of the electronic gaming machine and an audible sound for presentment via a sound speaker of the electronic gaming machine.

6. The system of claim 1, wherein the one or more local game assets and the one or more replacement game assets comprise non-behavioral data the presence of which does not affect the outcome of the wagering game.

7. A method, comprising:

under the control of a processor, presenting a wagering game at an electronic gaming machine in accordance with a gaming application stored on a local memory of the electronic gaming machine;

communicating a query from the electronic gaming machine to an asset server which stores schedule data specifying one or more replacement game assets and a respective time for each of the one or more replacement game assets to be presented at the electronic gaming machine, and determining whether the schedule data specifies that the one or more replacement game assets are scheduled to be presented at the electronic gaming machine in connection with the wagering game in lieu of one or more local game assets stored on the local memory; and in response to determining that the one or more replacement game assets are scheduled to be presented at the electronic gaming machine:

downloading the one or more replacement game assets stored remotely from the wagering game to the local memory; and presenting the one or more replacement game assets in lieu of the one or more local game assets during presentation of the wagering game.

8. The method of claim 7, further comprising communicating the query at regular intervals.

9. The method of claim 7, further comprising communicating to the electronic gaming machine one or more addresses for the one or more replacement game assets in response to determining that the one or more replacement game assets are scheduled to be presented at the electronic gaming machine.

10. The method of claim 7, further comprising presenting the one or more local game assets at the electronic gaming machine if the one or more replacement game assets are not scheduled to be presented at the electronic gaming machine.

11. The method of claim 7, wherein the one or more local game assets and the one or more replacement game assets comprise at least one of a graphic for presentment via a display device of the electronic gaming machine and an audible sound for presentment via a sound speaker of the electronic gaming machine.

12. The method of claim 7, wherein the one or more local game assets and the one or more replacement game assets comprise non-behavioral data the presence of which does not affect the outcome of the wagering game.

13. An article of manufacture, comprising:

a non-transitory computer readable medium; and computer-executable instructions carried on the computer readable medium, the instructions readable by a processor, the instructions, when read and executed, for causing the processor to:

present a wagering game at an electronic gaming machine in accordance with a gaming application stored on a local memory of the electronic gaming machine;

communicate a query from the electronic gaming machine to an asset server which stores schedule data specifying one or more replacement game assets and a respective time for each of the one or more replacement assets to be presented at the electronic gaming machine, and determine whether the schedule data specifies that the one or more replacement game assets are scheduled to be presented at the electronic gaming machine in connection with the wagering game in lieu of one or more local game assets stored on the local memory; and in response to determining that the one or more replacement game assets are scheduled to be presented at the electronic gaming machine:

download the one or more replacement game assets stored remotely from the wagering game to the local memory; and present the one or more replacement game assets in lieu of the one or more local game assets during presentation of the wagering game.

14. The article of claim 13, further comprising instructions for causing the processor to:

receive from the asset server one or more addresses for the one or more replacement game assets in response to determining that the one or more replacement game assets are scheduled to be presented at the electronic gaming machine; and download the one or more replacement game assets based on the one or more addresses.

15. The article of claim 13, further comprising instructions for causing the processor to communicate the query at regular intervals.

16. The article of claim 13, further comprising instructions for causing the processor to present the one or more local game assets if the one or more replacement game assets are not scheduled to be presented at the electronic gaming machine.

17. The article of claim 13, wherein the one or more local game assets and the one or more replacement game assets comprise at least one of a graphic for presentment via a display device of the electronic gaming machine and an audible sound for presentment via a sound speaker of the electronic gaming machine.

18. The article of claim 13, wherein the one or more local game assets and the one or more replacement game assets comprise non-behavioral data the presence of which does not affect the outcome of the wagering game.

* * * * *